United States Patent [19]
Peterson

[11] Patent Number: 6,140,800
[45] Date of Patent: Oct. 31, 2000

[54] AUTONOMOUS BATTERY EQUALIZATION CIRCUIT

[76] Inventor: William Anders Peterson, 2629 Pinebluff Dr., Vestal, N.Y. 13850

[21] Appl. No.: 09/320,689

[22] Filed: May 27, 1999

[51] Int. Cl.[7] ........................................................ H02J 7/00
[52] U.S. Cl. ............................. 320/118; 320/103; 320/128
[58] Field of Search ..................................... 320/118, 119, 320/116, 128, 103

[56] References Cited

U.S. PATENT DOCUMENTS

| | | |
|---|---|---|
| 4,079,303 | 3/1978 | Cox . |
| 4,502,001 | 2/1985 | Galloway . |
| 4,949,028 | 8/1990 | Brune . |
| 4,967,136 | 10/1990 | Nofzinger . |
| 5,003,244 | 3/1991 | Davis, Jr. . |
| 5,479,083 | 12/1995 | Brainard . |
| 5,528,122 | 6/1996 | Sullivan et al. . |
| 5,710,504 | 1/1998 | Pascual et al. . |
| 5,742,150 | 4/1998 | Khuwatsamrit . |
| 5,821,729 | 10/1998 | Schmidt et al. . |

OTHER PUBLICATIONS

The Use Of Equalizing Converters for Serial Charging Of Long Battery Strings, D.C. Hopkins, C.R. Mosling, and S.T. Hung, 1991 IEEE, pp. 493–498.

Charge Equalization for Series Connected Battery Strings, Nasser H. Kutkut, Deepak M. Divan, Donald W. Novotny, 1994 IEEE, pp. 1008–1015.

Design Considerations for Charge Equalization Of An Electric Vehicle Battery System, Nasser H. Kutkut, H.L.N. Wiegman, Deepak M. Divan, D.W. Novotny, 1995 IEEE, pp. 96–103.

Power Electronics, Converters, Applications, and Design, Second Edition, John Wiley & Sons, Inc., Chapter 9, pp. 249–297.

*Primary Examiner*—Edward H. Tso
*Assistant Examiner*—Gregory J. Toatley, Jr.

[57] ABSTRACT

A battery equalization circuit for equalizing charge between at least first and second series connected batteries includes a switching circuit and a resonant circuit. Each battery has a positive end and a negative end, where the positive end of the second battery is coupled to the negative end of the first battery at a common node. The switching circuit is connectable to (i) the positive end of the first battery at a positive node, and (ii) the negative end of the second battery at a negative node; and the resonant circuit is connectable between the switching circuit and the common node of the batteries, wherein the switching circuit is adapted to alternately couple the resonant circuit in parallel with the first and second batteries such that a DC current component flows between the first and second batteries through the resonant circuit as a function of a charge imbalance therebetween.

36 Claims, 4 Drawing Sheets

AUTONOMOUS BATTERY EQUALIZATION CIRCUIT

BACKGROUND OF THE INVENTION

1. Field of the Invention

The present invention relates to battery equalization techniques and, more particularly, to battery equalization apparatus employing resonant circuits.

2. Related Art

Batteries are typically connected in series such that a relatively large total voltage is available to drive a load. As it is desirable to utilize rechargeable batteries, battery charger circuits have been developed which charge all of the batteries in a series at one time.

Care must be taken to charge each battery in the series fully without one battery being at a higher state of charge than another battery. If a difference exists between a relatively low charge on one battery with respect to the other batteries in the series, the total effective capacity of the series of batteries is reduced to the capacity of the battery having the low state of charge.

Battery equalization circuits have been developed to ensure that all batteries in a series attain substantially the same state of charge. U.S. Pat. No. 5,479,083 to Brainard illustrates a conventional battery equalization circuit 10. The circuit is shown in FIG. 1 herein.

The Brainard patent shows a series coupled pair of batteries B1, B2 which may be charged via a charging circuit 12. An equalization circuit includes a pair of series coupled transistors Q1, Q2 connected across the series coupled batteries. An inductor L is Connected between the pair of transistors Q1, Q2 and the batteries B1, B2. An oscillator 14 produces gate drive signals to transistors Q1, Q2 such that they are alternately biased on and off for substantially equal durations. The inductor operates as a non-dissipative shunt that is alternately switched in parallel with each battery such that excessive charge on one battery is transferred to the other battery.

Unfortunately, component tolerances within the Brainard equalization circuit 10 will effect the degree of equalization achieved between the batteries. Indeed, tolerances which effect the duty cycle of the oscillator 14 and the resultant duty cycle presented by the transistors Q1, Q2 to the batteries will substantially effect the quality of equalization. Therefore, in order to obtain satisfactory equalization, measurements of the charge on each battery must be obtained and feed back to the oscillator to change the duty cycle as necessary (see FIG. 3 of the Brainard patent).

U.S. Pat. No. 5,710,504 to Pascual discloses a battery equalization circuit which does not require a feed back mechanism from each battery to achieve adequate equalization. However, the circuit of the Pascual patent requires that all switching devices within the circuit be synchronized no matter how many batteries are in the series combination.

When the number of series coupled batteries is relatively high and results in a high terminal voltage from the uppermost battery to the lowermost battery, the topology of the Pascual circuit may result in undesirable fault conditions.

Turning to FIG. 1 of the Pascual '504 patent, a plurality of series coupled batteries are shown and all switches 16 are synchronized via control lines 18 and control unit 12. Assuming that the total voltage from the uppermost battery to the lowermost battery is substantially large (e.g., 600 volts), a practical circuit must be designed to withstand a fault from the uppermost battery terminal to the lowermost battery terminal through the wiring of the equalization circuit. Often, the series coupled batteries may deliver many amps (approaching 1000 amps or more) making it difficult to design for surviving a fault and not damaging any of the batteries.

Accordingly, there is a need in the art for a new battery equalization circuit which is capable of autonomous operation (i.e., not requiring synchronization with other equalization circuits servicing the series coupled batteries) and does not require closed loop compensation to achieve satisfactory equalization.

SUMMARY OF THE INVENTION

The battery equalization circuit of the present invention operates to equalize charge between at least first and second series connected batteries. Each battery has a positive end and a negative end, where the positive end of the second battery is coupled to the negative end of the first battery at a common node. A switching circuit is connectable to (i) the positive end of the first battery at a positive node, and (ii) the negative end of the second battery at a negative node; and a resonant circuit is connectable between the switching circuit and the common node of the batteries, wherein the switching circuit is adapted to alternately couple the resonant circuit in parallel with the first and second batteries such that a DC current component flows between the first and second batteries through the resonant circuit as a function of a charge imbalance therebetween.

The resonant circuit is preferably a series resonant circuit including a resonant inductor coupled in series with a resonant capacitor. A DC bypass circuit is connected across the resonant capacitor such that a DC current component may flow therethrough and into one of the first and second batteries. The DC bypass circuit preferably includes a bypass inductor, the bypass inductor having an inductance substantially larger than the resonant inductor.

The switching circuit preferably includes first and second switching transistors coupled in a half bridge configuration from the positive node to the negative node and defining an output node therebetween. A transistor drive circuit is provided and adapted to produce first and second bias signals for turning the first and second switching transistors on and off, respectively. The transistor drive circuit is coupled to the resonant inductor such that the first and second bias signals are a function of a voltage across the resonant inductor.

First and second windings wound on a common core of the resonant inductor are preferably included in the switching circuit, the first and second windings being wound oppositely with respect to one another and coupled to bias terminals of the first and second switching transistors, respectively. The voltage across the resonant inductor induces proportional bias voltages for biasing the first and second switching Transistors on and off in a positive feedback arrangement.

First and second bypass capacitors may be provided, the first bypass capacitor coupled from the positive node to the common node and the second bypass capacitor coupled from the common node to the negative node. First and second bypass diodes may also be provided, the first diode being coupled with its anode from the intermediate node of the resonant circuit to the positive node, and the second diode being coupled with its cathode from the intermediate node of the resonant circuit to the negative node.

Other objects, features, and advantages of the present invention will become apparent to those skilled in the art from the teachings herein taken in conjunction with the accompanying drawing.

BRIEF DESCRIPTION OF THE DRAWING

For the purposes of illustrating the invention, there are shown in drawing forms which are presently preferred, it being understood, however, that the present invention is not limited to the precise arrangements and instrumentalities shown.

DETAILED DESCRIPTION OF THE PREFERRED EMBODIMENTS

Figure 2:
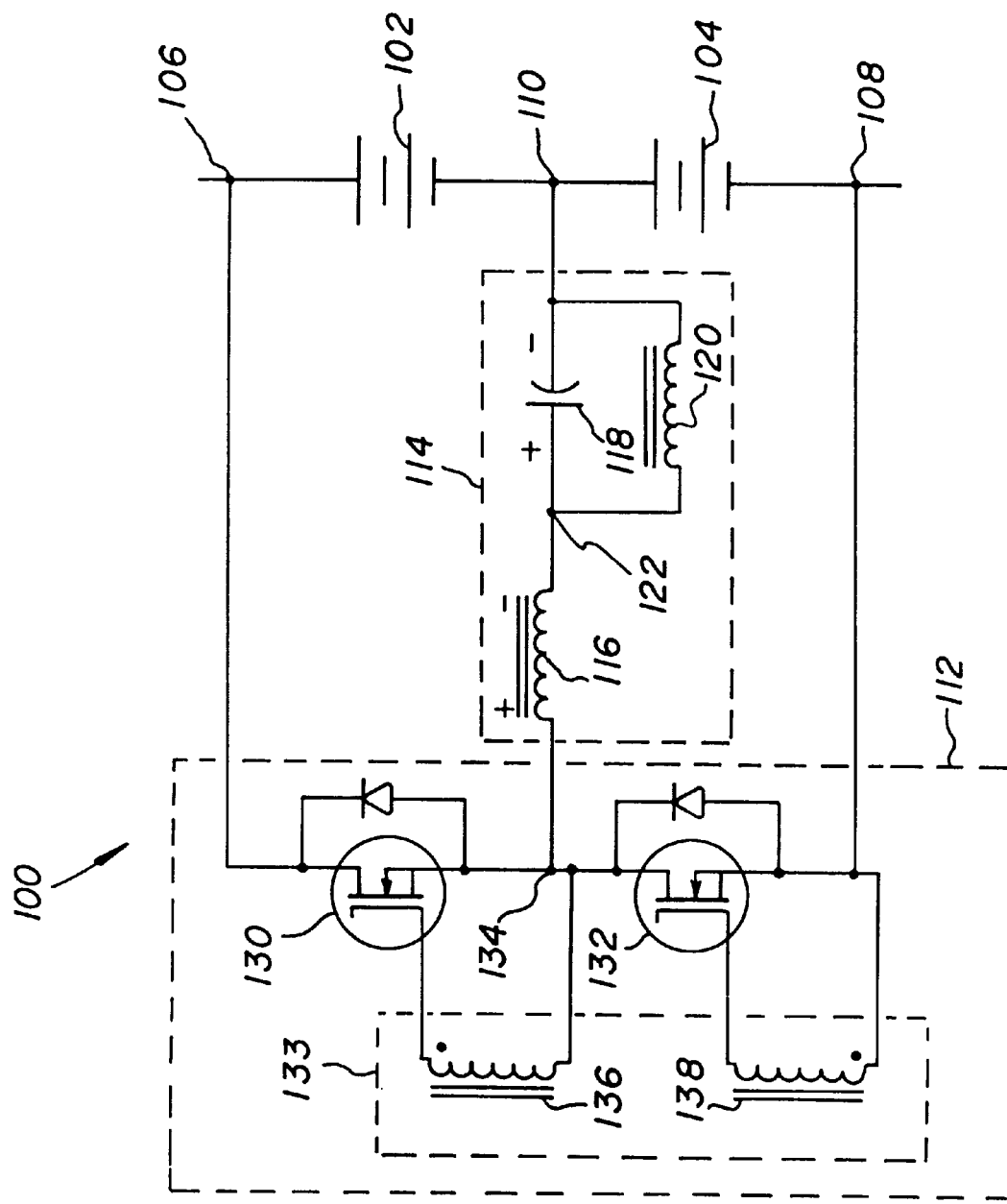
FIG. 2 is a charge equalization circuit according to the present invention.

With reference to the accompanying drawing, wherein like numerals indicate like element,, there is shown in FIG. 2 a circuit diagram illustrating a charge equalization circuit 100 according to the present invention.

The charge equalization circuit 103 is operable to equalize the charge contained on respective series coupled batteries 102 and 104. Battery 102 includes a positive end coupled to positive node 106 and a negative end coupled to a common node 110. Battery 104 includes a positive end coupled to common node 110 and a negative end coupled to negative node 108.

Those skilled in the art will appreciate that the charge equalization circuit 100 of the present invention need not operate with two completed batteries, such as batteries 102 and 104, but may also operate with the individual cells within a particular battery. In such a case, battery 102 and battery 104 may be thought of as individual series coupled cells within one battery.

The charge equalization circuit 100 according to the present invention includes a switching circuit 112 connectable to the positive node 106 and the negative node 108 of the series coupled batteries and also includes a resonant circuit 114 connectable between the switching circuit 112 and the common node 110 of batteries 102, 104.

The resonant circuit 114 is preferably a series resonant circuit including a resonant inductor 116 and a resonant capacitor 120 connected in series and defining an intermediate node 122 therebetween. The resonant circuit 114 also preferably includes a DC bypass circuit connected across the resonant capacitor 118 such that DC current may flow through the resonant circuit 114 from the switching circuit 112 to the batteries 102, 104. It is most preferred that the DC bypass circuit include an inductor 120 connected in a shunt configuration with resonant capacitor 118.

Those skilled in the art will appreciate from the teaching hereinbelow that inductor 120 should have an inductance substantially larger than that of resonant inductor 116, although inductance values for inductor 120 approaching (or lower than) that of resonant: inductor 116 are also contemplated as being within the scope of the invention.

The switching circuit 112 preferably includes a series coupled pair of transistors 130, 132 connected in a half bridge configuration from the positive node 106 to the negative node 108, the transistors 130, 132 defining an output node 134 therebetween. The switching circuit 112 also preferably includes a transistor drive circuit 133 operable to produce bias signals for alternately biasing transistors 130, 132 on and off. Preferably, the transistor drive circuit 133 is coupled to the resonant inductor 116 such that the bias signals to the transistors 130, 132 are a function of the voltage across the resonant inductor 116.

Transistor drive circuit 133 preferably includes windings 136, 138 wound on a common core with the resonant inductor 116 such that the voltage across the resonant inductor 116 induces voltages across respective windings 136, 138. Windings 136 and 138 are wound oppositely such that the respective polarities of the induced voltages are opposite.

Preferably, transistors 130, 132 are MOS-gated devices, with MOSFETs being most preferred. Windings 136 and 138 are connected from gate to source of transistors 130, 132, respectively.

Figure 3A:
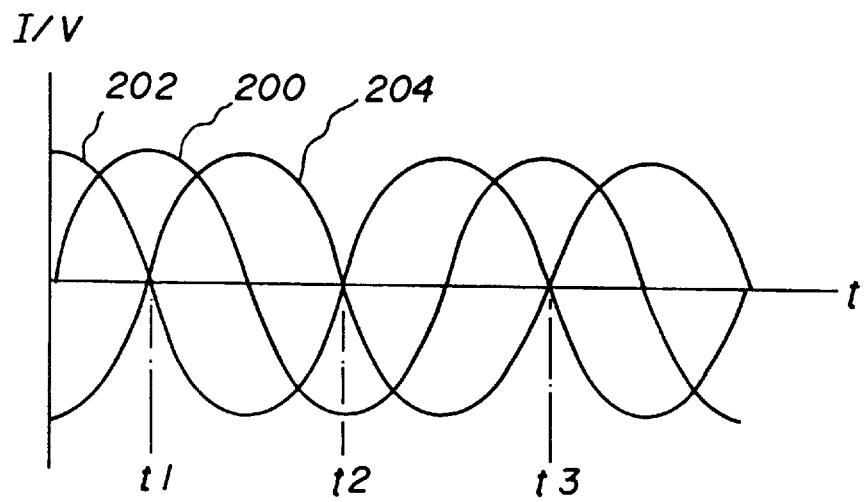
FIGS. 3a–3b are graphs illustrating certain waveforms present in the circuit of FIG. 2.

Reference is now made to FIG. 3a which is a graph illustrating the relationships between certain voltages and currents of the charge equalization circuit 100 of FIG. 2. For simplicity, the waveforms shown represent circuit operation when the charges on each battery 102, 104 are substantially equal.

An alternating current flowing through the resonant inductor 116 and resonant capacitor 118 is labelled 200. The inductance of the resonant inductor 116 and capacitance of the resonant capacitor 120 define a resonant frequency and the alternating current 200 substantially matches the resonant frequency.

In general, the voltage 202 across the resonant inductor 116 lags the alternating current 200 therethrough by 90 electrical degrees, while the voltage 204 across the resonant capacitor 118 leads the current therethrough by about 90 electrical degrees.

Figure 3B:
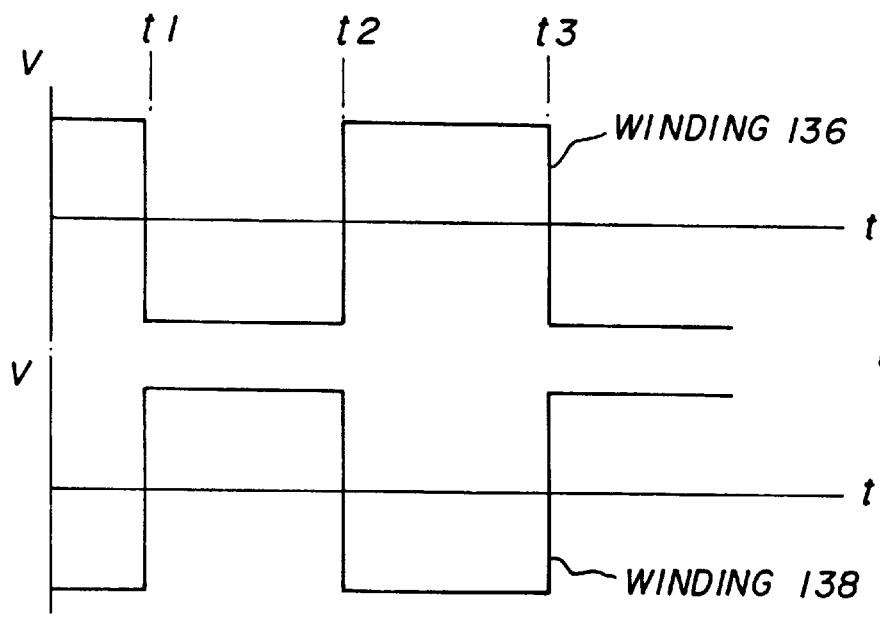

Reference is now made to FIG. 3b which illustrates waveforms representing the bias voltages produced by the transistor drive circuit 133 for biasing transistors 130, 132 on and off. For simplicity, the waveforms of FIG. 3b are shown as square waxes, although those skilled in the art will appreciate that in practice the waveforms are more complex.

Figure 1:
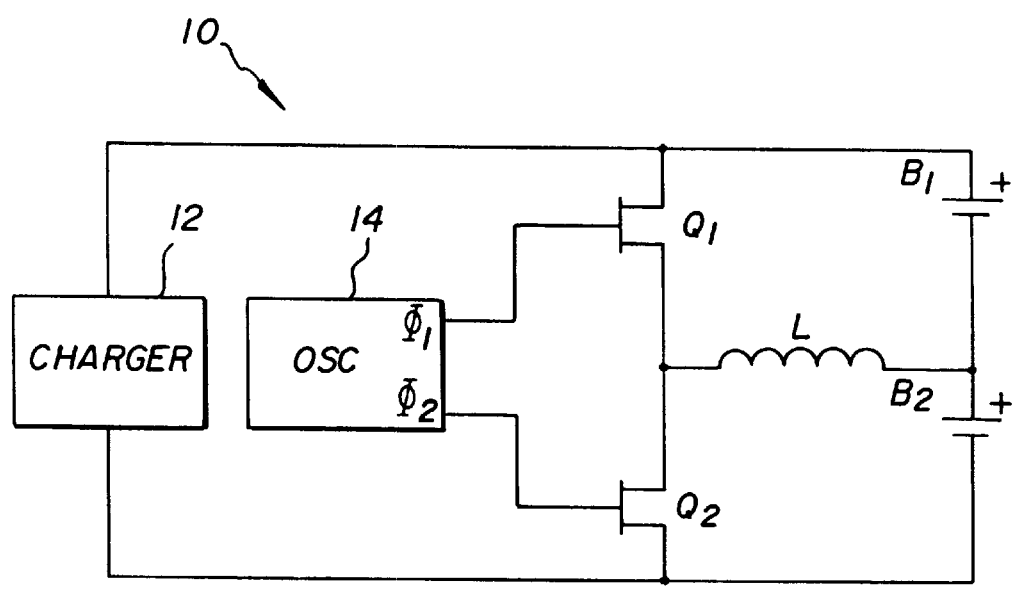
FIG. 1 is a battery equalization circuit according to the prior art.

At time t1, the voltage 202 across resonant inductor 116 is substantially negative (the plurality shown across inductor 116 in FIG. 1 being defined as positive). Accordingly, the voltage induced across winding 138 is positive, turning transistor 132 on. Transistor 130 is biased off at time t1. At time t2, the voltage 202 across resonant inductor 116 is substantially positive and the voltage induced across winding 136 is also positive, turning transistor 130 on. Transistor 132 is biased off at time t2.

With reference to FIG. 3a, the alternating current 200 from time t1 through t2 flows into and out of battery 104, while the current 200 from times t2 through t3 flows into and out of battery 102. When the charge on battery 102 is substantially equal to the charge on battery 104, the amount of current flowing into and out of battery 104 (time t1 through t2) is substantially equal. Similarly, the amount of current flowing into and out of battery 102 (time t2 through t3) is substantially equal.

When the respective charges on batteries 102 and 104 are not balanced, a DC voltage offset across resonant capacitor 18 will tend to develop; however, bypass inductor 120 will shunt DC currents to one of the batteries until charge is equalized. Thus, current 200 would include a DC component (i.e., a shift up or down) proportional to the difference in charge between batteries 102 and 104. Once the charge is equalized between batteries 102 and 104, current 200 would contain substantially no DC offset.

Those skilled in the art will appreciate that the waveforms illustrated in FIG. 3a represent substantially ideal waveforms and that in practice slightly different waveforms will obtain. Indeed, transistors 130, 132 exhibit respective turn on threshold voltages below which the transistors will not turn on. Consequently, as the voltage across the resonant inductor 116 approaches zero volts (e.g., at time t1), the induced voltage across winding 136 approaches the threshold voltage of transistor 130. As transistor 130 begins to turn off, transistor 130 tends to limit the current 200 flowing (from left to right) in the resonant inductor 116. The resonant inductor 116 will oppose such a reduction in current and the voltage 202 across inductor 116 will change polarity. The induced voltage across winding 136 will also change polarity, thereby rapidly turning transistor 130 off.

Those skilled in the art will appreciate that the voltage 202 across resonant inductor 116 is fed back to transistor drive circuit 133 (e.g., via winding 136) and introduces positive feedback in turning Transistor 130 off. A similar analysis obtains with respective to winding 138 and transistor 132 at time t2.

In a practical circuit, therefore, the bias signals produced by the transistor drive circuit 133 cause the resonant circuit 114 to operate at a frequency slightly above the resonant frequency, where the resonant circuit 114 will enjoy a dominant inductive characteristic.

Figure 4:
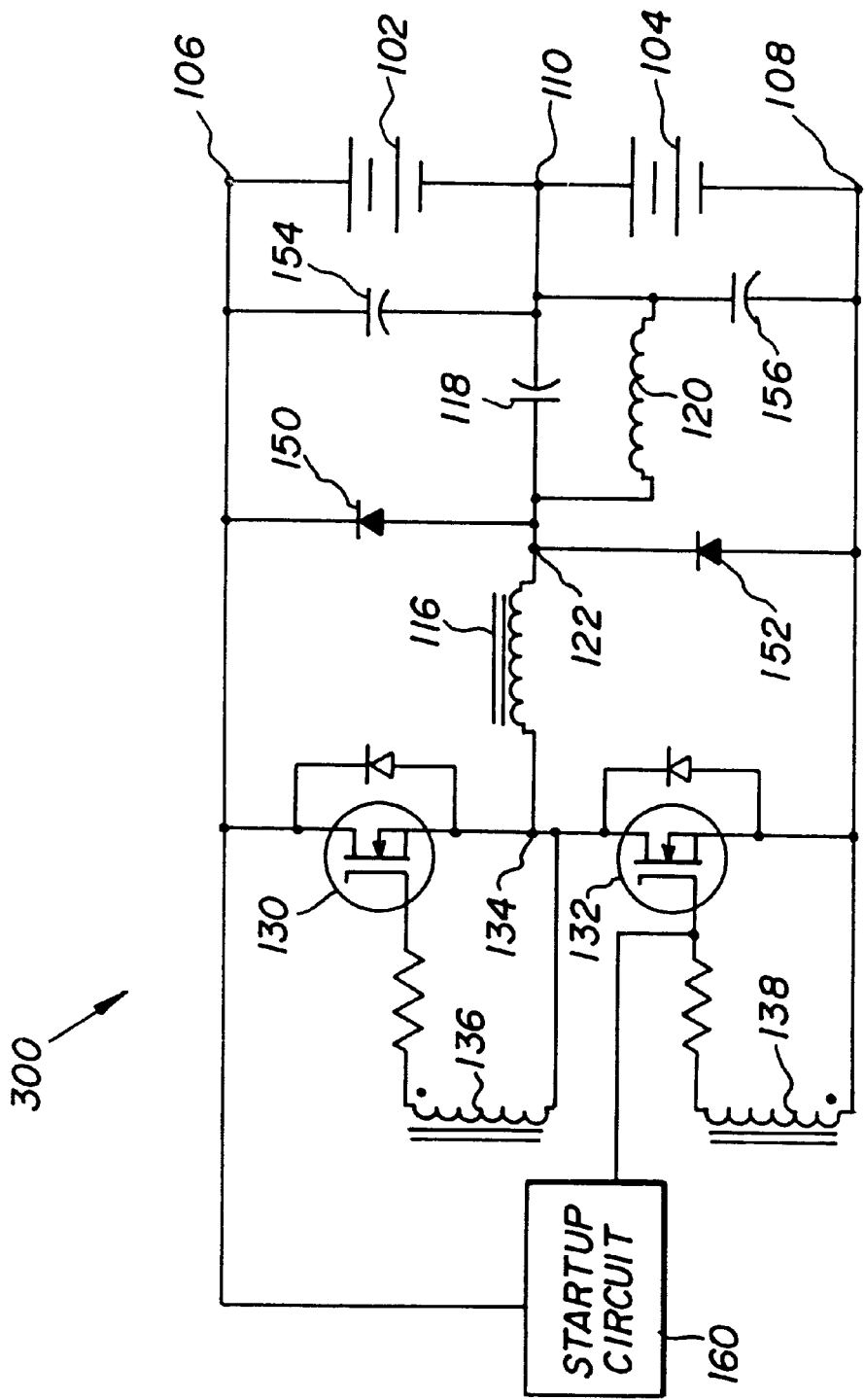
FIG. 4 is a schematic diagram illustrating additional details of a charge equalization circuit according to the present invention.

Reference is now made to FIG. 4 which illustrates a charge equalization circuit 300 according to an alternative embodiment of the present invention. The charge equalization circuit 300 includes substantially similar circuit components as shown in FIG. 2 but also includes diodes 150, 152 and capacitors 154, 156. Capacitors 154 and 156 operate as low impedance AC bypass circuits such that circulating resonant currents flow substantially through capacitors 154 arid 156 rather than through batteries 102 and 104. Advantageously, batteries 102 and 104 do not exhibit losses and degradation from the circulating resonant currents.

Diodes 150 and 152 are coupled from the intermediate node 122 of the resonant circuit 114 to the positive node 106 and negative node 108, respectively. Since the resonant circuit 114 operates near resonance with substantially no series resistance, the intermediate node 122 will tend to ring without bound.

Advantageously, diodes 150 and 152 prevent the voltage at the intermediate node 122 from climbing substantially above the voltage on battery 102 or substantially below the voltage on battery 104.

The charge equalization circuit 300 also includes a start-up circuit 160 which may be, for example, a push-to-start switch. Since the charge equalization circuit 300 can operate continuously, the start up circuit 160 need only be activated when the circuit is initially connected to the batteries 102, 104. Those skilled in the art will appreciate that the start up circuit 160 may enjoy continuous restart capability if a relaxation oscillator (for example employing an RC and DIAC configuration) is employed.

It is most preferred that the charge equalization circuit of the present invention be implemented on a circuit card which is disposed proximate to batteries 102 and 104. When the number of batteries exceeds 2, for example, 3, 4, 5, 6 etc., one charge equalization circuit 300 may be employed for each pair of batteries. Such pairs overlap, so that complete equalization among all batteries is achieved. If n batteries are to be equallized, then 9n–10 equalization circuits are required.

Advantageously, no synchronization or other control signals need be shared between charge equalization circuits for other pairs of batteries (i.e., each charge equalization circuit is autonomous). The charge equalization circuits are thus distributed at the batteries for most convenient and safe operation.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A battery equalization circuit for equalizing charge between at least first and second series connected batteries, each battery including a positive end and a negative end, where the positive end of the second battery is coupled to the negative end of the first battery at a common node, the battery equalization circuit comprising:

a switching circuit connectable to (i) the positive end of the first battery at a positive node, and (ii) the negative end of the second battery at a negative node; and a resonant circuit connectable between the switching circuit and the common node of the batteries, wherein the switching circuit is adapted to alternately couple the resonant circuit in parallel with the first and second batteries such that a DC current component flows between the first and second batteries through the resonant circuit as a function of a charge imbalance therebetween.

2. The battery equalization circuit of claim 1, wherein the DC current component flows at least one of: (i) from the first battery to the second battery when the first battery has a charge greater than a charge on the second battery; and (ii) from the second battery to the first battery when the first battery has a charge less than the charge on the second battery, wherein the DC current component tends to equalize the charge between the first and second batteries.

3. The battery equalization circuit of claim 2, wherein the DC current component has a magnitude proportional to a difference in magnitude between the respective charges on the first and second batteries.

4. The battery equalization circuit of claim 3, wherein the resonant circuit is a series resonant circuit including a resonant inductor coupled in series with a resonant capacitor.

5. The battery equalization circuit of claim 4, wherein the series coupled resonant inductor and resonant capacitor include a first node connected to the switching circuit, a second node connectable to the common node of the batteries, and an intermediate node connecting the resonant inductor to the resonant capacitor.

6. The battery equalization circuit of claim 5, wherein the series resonant circuit includes a DC bypass circuit connected across the resonant capacitor such that the DC current component may flow therethrough and into one of the first and second batteries.

7. The battery equalization circuit of claim 6, wherein the DC bypass circuit includes a bypass inductor, the bypass inductor having an inductance substantially larger than the resonant inductor.

8. The battery equalization circuit of claim 7, wherein imbalances between the respective charges on the first and second batteries tends to induce a DC voltage component across the resonant capacitor, the bypass inductor providing a DC current path across the resonant capacitor such that the DC current component may flow through the bypass inductor and into one of the first and second batteries.

9. The battery equalization circuit of claim 5, wherein the switching circuit includes first and second switching transistors coupled in a half bridge configuration from the positive node to the negative node and defining an output node therebetween, the first node of the resonant circuit being coupled to the output node.

10. The battery equalization circuit of claim 9, wherein the switching circuit includes a transistor drive circuit adapted to produce first and second bias signals for turning the first and second switching transistors on and off, respectively, the transistor drive circuit being coupled to the resonant inductor such that the first and second bias signals are a function of a voltage across the resonant inductor.

11. The battery equalization circuit of claim 10, wherein the transistor drive circuit produces the first bias signal to (i) bias the first transistor on and the second transistor off when the voltage across the resonant inductor is generally positive, (ii) bias the first transistor off and the second transistor on when the voltage across the resonant inductor is generally negative.

12. The battery equalization circuit of claim 11, wherein the transistor drive circuit includes first and second windings wound on a common core of the resonant inductor, the first and second windings being wound oppositely with respect to one another and coupled to bias terminals of the first and second switching transistors, respectively.

13. The battery equalization circuit of claim 12, wherein the first and second switching transistors are MOS gated transistors, each having gating terminals, the first and second windings being coupled to the respective gating terminals.

14. The battery equalization circuit of claim 13, wherein the first and second switching transistors are MOSFETs, a source of the first switching transistor being coupled to a drain of the second switching transistor at the output node, the first and second windings being coupled from respective gates to sources of the first and second switching transistors.

15. The battery equalization circuit of claim 11, wherein the transistor drive circuit is adapted such that the voltage across the resonant inductor induces proportional bias voltages for biasing the first and second switching transistors on and off in a positive feedback arrangement.

16. The battery equalization circuit of claim 15, wherein each switching transistor has a threshold voltage of a magnitude below which the switching transistor will be biased off, the positive feedback of the transistor drive circuit operating such that as the magnitude of the voltage across the resonant inductor approaches zero, one of the bias voltages approaches the respective threshold voltage tending to (i) bias the corresponding switching transistor off, (ii) cause reduced current through the resonant inductor, (iii) cause reversal of the voltage across the resonant inductor, and (iv) cause the bias voltage to fall below the respective threshold voltage and fully bias the corresponding switching transistor off.

17. The battery equalization circuit of claim 16, wherein reactive values of the resonant inductor and resonant capacitor define a resonant frequency, the positive feedback of the transistor drive circuit causing the current through, and the voltages across, the resonant inductor and resonant capacitor to exhibit a frequency slightly above the resonant frequency.

18. The battery equalization circuit of claim 8, further comprising first and second bypass capacitors, the first bypass capacitor coupled from the positive node to the common node and the second bypass capacitor coupled from the common node to the negative node.

19. The battery equalization circuit of claim 18, wherein the first and second bypass capacitors have reactive values sufficient to shunt circulating currents from the resonant circuit from flowing in the respective batteries.

20. The battery equalization circuit of claim 8, further comprising first and second bypass diodes having respective anodes and cathodes, the first diode being coupled with its anode from the intermediate node of the resonant circuit to the positive node, and the second diode being coupled with its cathode from the intermediate node of the resonant circuit to the negative node, the first and second diodes preventing a voltage at the intermediate node from rising substantially above the first battery voltage or falling substantially below the second battery voltage.

21. A battery equalization circuit for equalizing charge between at least first and second series connected battery cells, each battery cell including a positive end and a negative end, where the positive end of the second battery cell is coupled to the negative end of the first battery cell at a common node, the battery equalization circuit comprising:
  a switching circuit connectable to (i) the positive end of the first battery cell at a positive node, and (ii) the negative end of the second battery cell at a negative node; and
  a resonant circuit connectable between the switching circuit and the common node of the battery cells,
  wherein the switching circuit is adapted to alternately couple the resonant circuit in parallel with the first and second battery cells such that a DC current component flows between the first and second battery cells through the resonant circuit as a function of a charge imbalance therebetween.

22. The battery equalization circuit of claim 21, wherein each of the first and second battery cells include two or more sub-cells forming the respective battery cell.

23. The battery equalization circuit of claim 21, wherein the resonant circuit is a series resonant circuit including a resonant inductor coupled in series with a resonant capacitor.

24. The battery equalization circuit of claim 23, wherein the series coupled resonant inductor and resonant capacitor include a first node connected to the switching circuit, a second node connectable to the common node of the battery cells, and an intermediate node connecting the resonant inductor to the resonant capacitor.

25. The battery equalization circuit of claim 24, wherein the series resonant circuit includes a DC bypass circuit connected across the resonant capacitor such that the DC current component may flow therethrough and into one of the first and second battered cells.

26. The battery equalization circuit of claim 25, wherein the DC bypass circuit includes a bypass inductor, the bypass inductor having an inductance substantially larger than the resonant inductor.

27. The battery equalization circuit of claim 26, wherein imbalances between the respective charges on the first and second batteries tends to induce a DC voltage component across the resonant capacitor, the bypass inductor providing a DC current path across the resonant capacitor such that the DC current component may flow through the bypass inductor and into one of the first and second battery cells.

28. The battery equalization circuit of claim 25, wherein the switching circuit includes first and second switching transistors coupled in a half bridge configuration from the positive node to the negative node and defining an output node therebetween, the first node of the resonant circuit being coupled to the output node.

29. The battery equalization circuit of claim 28, wherein the switching circuit includes a transistor drive circuit adapted to produce first and second bias signals for turning the first and second switching transistors on and off, respectively, the transistor drive circuit being coupled to the resonant inductor such that the first and second bias signals are a function of a voltage across the resonant inductor.

30. The battery equalization circuit of claim 29, wherein the transistor drive circuit produces the first bias signal to (i) bias the first transistor on and the second transistor off when the voltage across the resonant inductor is generally positive, (ii) bias the first transistor off and the second transistor on when the voltage across the resonant inductor is generally negative.

31. The battery equalization circuit of claim 30, wherein the transistor drive circuit includes first and second windings wound on a common core of the resonant inductor, the first and second windings being wound oppositely with respect to one another and coupled to bias terminals of the first and second switching transistors, respectively.

32. The battery equalization circuit of claim 31, wherein the first and second switching transistors are MOS gated transistors, each having gating terminals, the first and second windings being coupled to the respective gating terminals.

33. The battery equalization circuit of claim 32, wherein the first and second switching transistors are MOSFETs, a source of the first switching transistor being coupled to a drain of the second switching transistor at the output node, the first and second windings being coupled from respective gate, to sources of the first and second switching transistors.

34. The battery equalization circuit of claim 21, further comprising first and second bypass capacitors, the first bypass capacitor coupled from the positive node to the common node and the second bypass capacitor coupled from the common node to the negative node.

35. The battery equalization circuit of claim 34, wherein the first and second bypass capacitors have reactive values sufficient to shunt circulating currents from the resonant circuit from flowing in the respective battery cells.

36. The battery equalization circuit of claim 21, further comprising first and second bypass diodes having respective anodes and cathodes, the first diode being coupled with its anode from the intermediate node of the resonant circuit to the positive node, and the second diode being coupled with its cathode from the intermediate node of the resonant circuit to the negative node.

* * * * *